Aug. 31, 1965   E. R. ELLIS   3,203,348
PRINTING APPARATUS
Filed Aug. 5, 1963   2 Sheets-Sheet 1
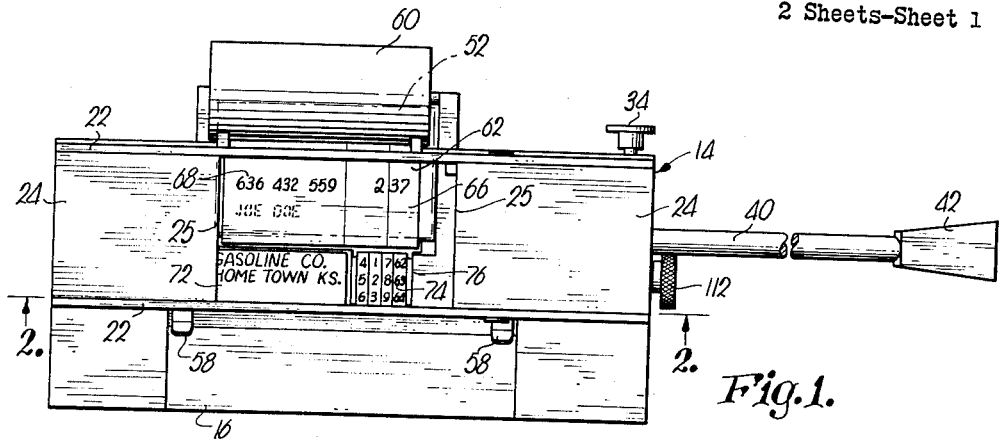
Fig.1.
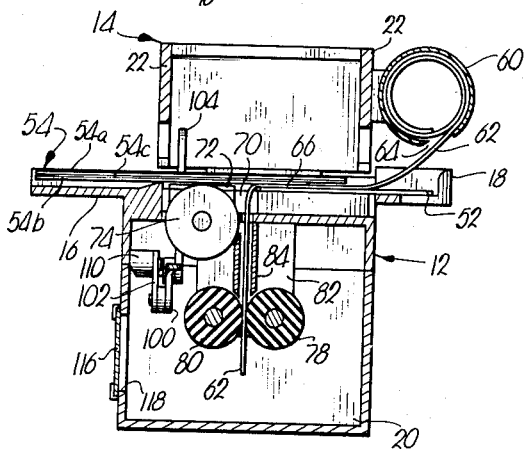
Fig.6.
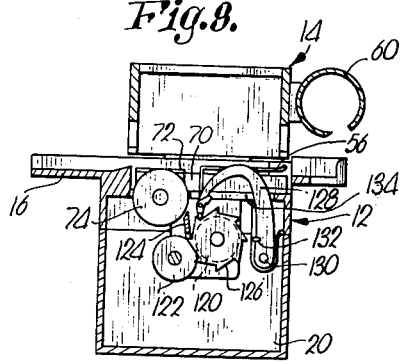
Fig.8.
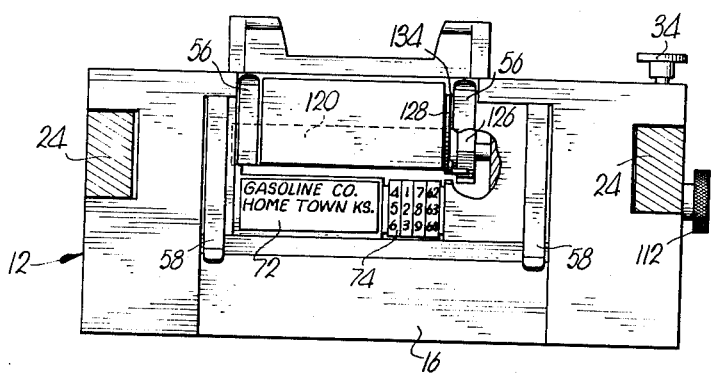
Fig.7.
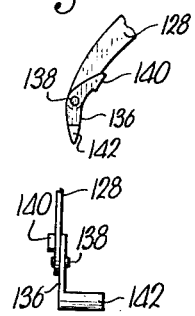
Fig.9.
Fig.10.
INVENTOR.
Edward R. Ellis
BY
Hovey, Schmidt, Johnson & Hovey
ATTORNEYS.

Aug. 31, 1965

E. R. ELLIS 3,203,348

PRINTING APPARATUS

Filed Aug. 5, 1963

INVENTOR.
Edward R. Ellis

BY

Hovey, Schmidt, Johnson & Hovey,
ATTORNEYS.

United States Patent Office

3,203,348
Patented Aug. 31, 1965

3,203,348
PRINTING APPARATUS
Edward R. Ellis, 7208 E. 84th, Kansas City, Mo.
Filed Aug. 5, 1963, Ser. No. 300,031
4 Claims. (Cl. 101—272)

This invention relates generally to printing apparatus of the type employed to imprint sales slips, delivery tickets, or the like with indicia contained on a printing plate. Such printing plates commonly take the form of credit cards or identification cards used by the printing apparatus to imprint the sales slips with indicia representing the customer bearing the credit card so that the account of the customer may be charged and the customer later billed.

Specifically, this invention is directed to improvements in credit card printing apparatus of the type frequently used by the operators of gasoline filling stations to charge the accounts of customers bearing credit cards issued by the gasoline company. Heretofore it has been necessary for the operator or dealer to manually record each sale and the corresponding credit card number or other indicia on a summary sheet, the sheet then being submitted to the gasoline company in exchange for cash. This, of course, is a somewhat time-consuming operation.

It is, therefore, the primary object of this invention to provide apparatus that will materially decrease the time required to prepare the aforesaid summary sheet.

It is another object of this invention to provide means for utilization with credit card printing apparatus whereby the indicia on each customer's credit card is imprinted on a summary sheet simultaneously with the imprinting of the usual sales slip.

It is another object of this invention to provide means for advancing a summary sheet across the credit card-receiving platform of credit card printing apparatus so that the indicia on the card will be imprinted on the sheet when the apparatus is operated. To this end, means is provided for advancing the summary sheet a predetermined distance each time the apparatus is operated so that the indicia on each credit card will be spaced along the sheet in tabular form.

Still another object of this invention is to provide means for advancing a summary sheet across the credit card-receiving platform as aforesaid which operates in response to actuation of the printing mechanism by the operator. In this manner, simultaneous imprinting of the summary sheet and the sales slip or slips is accomplished by a single operation.

Yet another object of this invention is to provide means for advancing the summary sheet across the credit card-bearing platform, which means is responsive to the placing of the credit card on the platform by the operator.

Other objects will become apparent as the detailed description proceeds.

In the drawings:

FIGURE 1 is a top plan view of the first embodiment of the printing apparatus of the present invention;

FIG. 6 is a sectional view taken along line 6—6 of FIG. 2;

FIG. 7 is a view similar to FIG. 3 showing the second embodiment of the instant invention with parts broken away for clarity;

FIG. 8 is a view similar to FIG. 6 showing the second embodiment of the invention;

FIG. 9 is a fragmentary, side elevational view of the nose of the pawl shown in FIG. 8;

FIG. 10 is a fragmentary, end elevational view of the nose of the pawl shown in FIG. 8.

Figure 2:
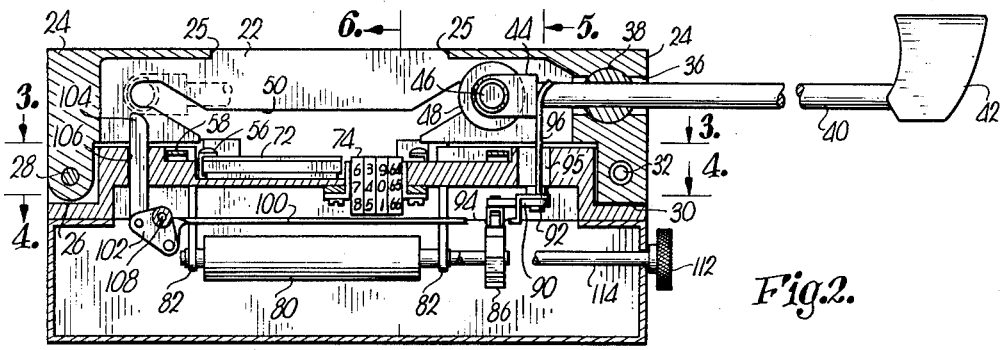
FIG. 2 is a sectional view taken along line 2—2 of FIG. 1 showing the interior of the apparatus with certain components thereof revealed in elevation for clarity.

Referring to the first embodiment of the instant invention revealed in FIGS. 1–6, a support in the form of a lower housing 12 is shown with an upper housing 14 disposed in overlying relationship thereto. The top of housing 12 is provided with a platform 16 extending laterally outwardly therefrom and provided with an upturned flange 18. The interior of housing 12 forms a receptacle 20 for purposes to be hereinafter set forth. The upper housing 14 comprises a pair of opposed rails or side plates 22 and a pair of opposed end members 24 connected with plates 22. The opposed margins 25 of members 24 and the plates 22 define a central opening in the top of housing 14. As is clear in FIGS. 2 and 3, the lower end of the left-hand end member 24 is received by a cutout 26 in housing 12, and a hinge pin 28 rotatably attaches the member to housing 12. The lower end of the right-hand end member 24 is received by a cutout 30 in housing 12, and a latch pin 32 releasably secures this member to housing 12. A knob 34 is attached to latch pin 32 to permit extraction of the pin when it is desired to rotate housing 14 about hinge 28.

A passage 36 in the right-hand member 24 receives a rotatable bushing 38 which, in turn, slidably receives a shaft 40. One end of shaft 40 has a handle 42 thereon permitting manual movement of the shaft axially thereof. The other end of shaft 40 is provided with a U-shaped bracket 44. An axle 46 is journalled on the bracket and an ink-bearing roller 48 is rotatably mounted on the axle.

Plates 22 are cut out to form tracks or camming surfaces 50 for guiding roller 48 during shifting thereof by shaft 40. The solid lines in FIG. 2 illustrate the inoperative position of roller 48 at the extreme right-hand end of tracks 50. The dotted lines reveal the disposition of the roller-supporting bracket 44 when the roller is in its other inoperative position at the extreme left-hand end of tracks 50.

Platform 16 serves as a support for a printing plate 52 in the form of a credit or identification card, and sales slips 54. Slips 54 comprise an original 54a, a duplicate copy 54b beneath original 54a, and a sheet of carbon paper 54c between the original and the copy. A pair of springs attached to platform 16 yieldably engage the upper surface of credit card 52 as the same is positioned on platform 16. In this manner a seat is formed by platform 16 and springs 56 for maintaining the credit card firmly in place during operation of the apparatus. Similarly, a pair of springs 58 on platform 16 are employed to hold slips 54 in place during the printing operation.

A tubular container 60 is mounted on housing 14 and has rolled therewithin a summary sheet in the form of a paper strip 62. Strip 62 is fed from container 60 through an opening 64 in the container, a portion 66 of strip 62 being disposed in overlying relationship to the indicia 68 on credit card 52 (indicia 68 commonly takes the form of a code number such as shown identifying the bearer of the card). A slot 70 in platform 16 allows strip 62 to pass over the edge of card 52 and into the receptacle 20.

A dealer name plate 72 is mounted on platform 16 as shown in FIG. 1. A date printer 74 is mounted in housing 12 below an opening 76 in platform 16 in a manner such that the type on the date printer will be level with the name plate 72.

A rotatable device in the form of a driven roller 78 is disposed within housing 12 in operable association with an idler roller 80. The shafts of rollers 78 and 80 are journalled on a pair of mounting members 82 rigid with housing 12. Rollers 78 and 80 may be composed of rubber or the like and are in closely spaced, parallel relationship so as to engage the opposed surfaces of strip 62. A guide 84 is employed to facilitate the feeding of strip 62 to rollers 78 and 80.

Figure 3:
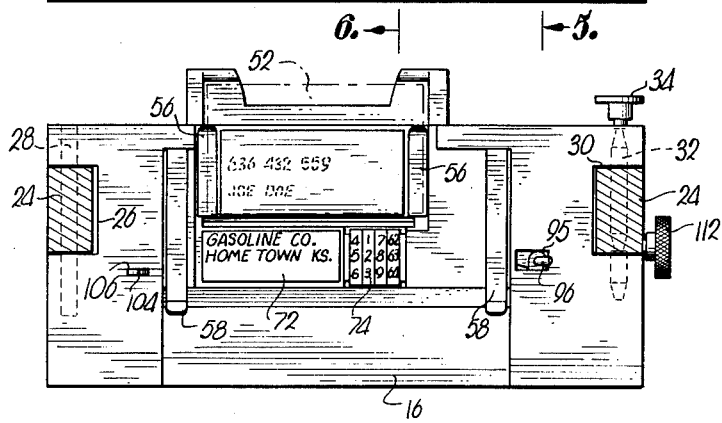
FIG. 3 is a sectional view taken along line 3—3 of FIG. 2.
Figure 4:
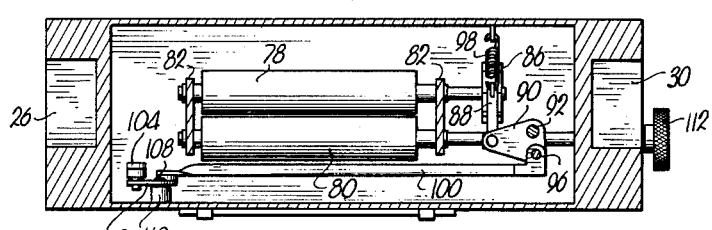
FIG. 4 is a sectional view taken along line 4—4 of FIG. 2.
Figure 5:
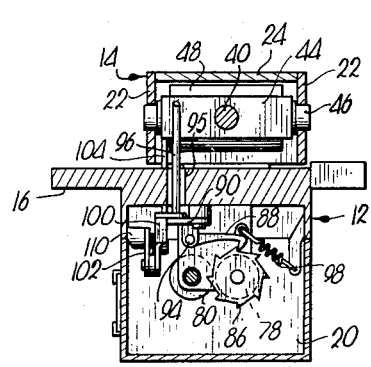
FIG. 5 is a sectional view taken along line 5—5 of FIG. 2.

A ratchet wheel 86 is attached to the shaft of roller 78 and is engaged by a pawl 88. Pawl 88 is coupled with a bell crank 90, the crank being secured to the housing for swinging movement about a vertical axis through pin 92. A fork 94, pivotal about a vertical axis, depends from bell crank 90 and connects with pawl 88 permitting movement of the pawl about a horizontal axis through the fork. A rod 96 extends upwardly from bell crank 90 through aperture 95 in platform 16 and is engageable with bracket 44. Movement of bracket 44 into the position shown by the full lines urges rod 96 rightwardly as shown in FIGS. 2–4 to swing crank 90 in a counterclockwise direction (as seen in FIG. 4) about pin 92. This action of the crank moves pawl 88 leftwardly as seen in FIG. 5 to rotate ratchet wheel 86 and roller 78. A spring 98 is coupled to pawl 88 and biases the pawl rightwardly as seen in FIG. 5 to return the pawl to a position permitting engagement thereof with the next tooth of ratchet wheel 86 when bracket 44 is moved out of engagement with rod 96.

A link 100 couples crank 90 with a triangular element 102. Element 102 has a finger 104 extending therefrom upwardly through a slit 106 in platform 16 for engagement by bracket 44 when the latter is in the left-hand position shown by the dotted lines. A pin 108 swingably mounts element 102 at one apex thereof to a boss 110 on housing 12. It may be appreciated that the other two apexes of element 102 serve as connecting points for finger 104 and link 100, respectively; therefore, shifting of link 100 longitudinally thereof effects vertical movement of finger 104.

A knob 112 is coupled by way of a shaft 114 with idler roller 80 so that the roller may be manually rotated to facilitate initial feeding of strip 60 through slot 70 and between the rollers 78 and 80. A sliding door 116 is normally registered with an opening 118 in receptacle 20 but may be manually moved to permit access to the strip 62 within the receptacle.

In the operation of the embodiment of the instant invention shown in FIGS. 1–6, the printing plate or credit card 52 is placed on platform 16 under springs 56 in the usual manner. In the present apparatus, however, it should be noted that the summary strip 62 has been added and will overlie the indicia 68 on the credit card. Therefore, when the sales slips 54 are placed on platform 16, portion 66 of strip 62 will be sandwiched between the slips and the credit card.

Figure 11:
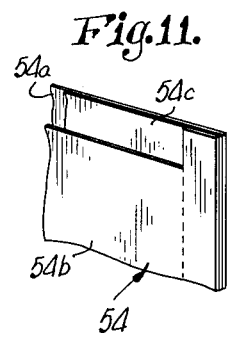
FIG. 11 is a fragmentary, perspective view of the sales slips or delivery tickets used with the instant invention.

In FIG. 11 a fragmentary view of the customary original and duplicate delivery tickets used by gasoline dealers are shown. In the instant invention, however, an alteration is made in these tickets in that the copy 54b is narrower than the original 54a and the carbon sheet 54c. Ordinarily, with originals and duplicates of equal widths, the indicia 68 on the credit card would be imprinted on the duplicate copy 54b during operation of the printing apparatus. In the instant invention, however, indicia 68 is no longer placed on copy 54b but, instead, is imprinted on summary strip 62 on the portion 66 thereof.

Referring to FIG. 1, it may be seen that the credit card 52 is inserted into the apparatus in underlying relationship to portion 66 of strip 62. Prior to insertion of the credit card, the operator fills out the delivery tickets or sales slips 54 and computes the total of the sale. Thus, upon insertion of the credit card into the machine as shown in FIG. 1, the total sales figure ($2.37 in the instant example) is written on portion 66 of the summary strip by the operator by inserting a pencil or other writing instrument through the opening in the top of housing 14. Sales slips or delivery tickets 54 may then be inserted into the apparatus and handle 42 operated to advance the inked roller 48 along tracks 50 from one end of the track to the opposite end thereof.

Intermediate the ends of tracks 50 it will be appreciated that the roller is forced downwardly and brought to bear upon the sales slips 54, pressing the same and the summary strip 62 between roller 48 and credit card 52. One-way movement of shaft 40 is all that is necessary to effect the desired printing, it being understood that the apparatus shown effects a printing operation each time roller 48 is moved from one end of tracks 50 to the other end thereof.

Assuming initial disposition of roller 48 as shown in FIG. 2 by the solid lines, leftward movement of the roller by operation of handle 42 moves bracket 44 out of engagement with rod 96 permitting spring 98 to move pawl 88 rightwardly as seen in FIG. 5 to a position where the pawl will effect rotation of ratchet wheel 86 upon subsequent leftward movement thereof against the action of spring 98 by the apparatus of the present invention. This actuation of pawl 88 is effected when roller carrying bracket 44 reaches the left-hand or dotted line position and engages finger 104 forcing the latter downwardly to move link 100 rightwardly. This rotates bell crank 90 about pin 92 in a counterclockwise direction as seen in FIG. 4 to actuate pawl 88 against the action of spring 98, thereby rotating ratchet wheel 86. It is evident that the next printing operation will effect similar actuation of pawl 88 when bracket 44 is brought into engagement with rod 96 and the latter is forced rightwardly to the position illustrated in the drawings.

It may be appreciated that, because of the frictional engagement of rollers 78 and 80 with the opposed surfaces of summary strip 62, the strip will be moved downwardly into receptacle 20 and an unused portion of the strip placed in overlying relationship with indicia 68. Thus, the summary strip is ready for the next printing operation automatically.

The second embodiment of the instant invention will now be described, like components of the two embodiments being designated by the same reference characters. Referring to FIGS. 8–10, it may be seen that a driven roller 120 and an idler roller 122 are employed to advance strip 62 (not shown) through slot 70 in platform 16. A guide 124 is employed to direct strip 62 through slot 70 and into proper disposition between the surfaces of rollers 120 and 122.

In this embodiment, driven roller 120, by means of its ratchet wheel 126 rigid with the axis of the roller, is advanced by an operating arm or pawl 128. Arm 128 is disposed within housing 12 as shown for pivotal movement about a horizontal axis perpendicular to the plane of the drawing through point 130 in FIG. 8. A spring is coupled with the arm 128 at 132 to bias the arm away from ratchet wheel 126, the normal position of the arm being as shown in FIG. 8. Arm 128 is longitudinally arcuate, the uppermost portion thereof being received by an opening 134 in platform 16 permitting the arm to protrude above the major plane of platform 16.

Referring particularly to FIGS. 9 and 10, it may be seen that the ratchet wheel-engaging end of arm 128 comprises a nosepiece 136 attached to the end of the arm by a pivot pin 138. Nosepiece 136 includes a laterally extending tab 140 engageable with the arm, and a laterally extending extension 142 engageable with ratchet wheel 126. It may be seen, particularly in FIG. 7, that arm 128 will be engaged by the bottom side of credit card 52 when the latter is inserted into the apparatus. Platform 16 in cooperation with springs 56 forms a seat for removably maintaining the credit card in proper position on the platform. Insertion of the card between the platform and springs 56 engages the uppermost portion of arm 128 extending through opening 134 and depresses the arm to, in turn, engage nose 136 thereof with ratchet wheel 126, thereby actuating the latter.

Since nose 136 is free to swing in a clockwise direction about pin 138 as viewed in FIGS. 8 and 9, removal of the credit card from its seat between platform 16 and springs 56 allows the arm to return to its inoperative position (as seen in FIG. 8), the nose 136 pivoting about pin 138 and riding over the teeth of ratchet wheel 126 during such return movement. During subsequent actuation of the arm by insertion of another credit card, however, tab 140 engages arm 128 to maintain the nose rigid so that extension 142 may engage the next tooth on the ratchet wheel and advance the same.

Since in the second embodiment of the invention the actuation of roller 120 and hence the advancing of strip 62, is rendered responsive to insertion of a credit card into the apparatus, it may be appreciated that the operational sequence of the apparatus may be changed from that as above described for the first embodiment of the invention. The credit card indicia 68 will be aligned with the corresponding sales total written on the summary strip regardless of whether or not such sales total is written on the strip before or after operation of the printing mechanism. (The printing operation is identical with that as above described for the embodiment of FIG. 1–6). It is only important that the credit card be inserted into the apparatus prior to writing the total on the summary strip. Thus filling out of the sales slips by the operator and computation of the sales total may be done either before or after the slips and the strip are imprinted.

Having thus described the invention, what is claimed as new and desired to be secured by Letters Patent is:

1. In printing apparatus for simultaneously imprinting a sales slip and a summary strip with indicia contained on a printing plate:
   a support having a seat for receiving said plate and means for receiving said sales slip with the slip in overlying relationship with said indicia;
   means for supporting said summary strip with a portion thereof in overlying relationship with said indicia;
   shiftable means on the support engageable with said strip for advancing the strip longitudinally thereof a predetermined distance each time the shiftable means is actuated;
   structure on the support movable between an inoperative position and a position where said slip and the portion of the strip overlying said indicia are pressed between the plate and the structure; and
   means operably coupled with said shiftable means and disposed for engagement by said plate as the latter is placed in said seat for actuating the shiftable means upon said engagement to advance the strip said predetermined distance, whereby a different portion of the strip is aligned with said indicia during the seating of the plate.

2. In printing apparatus for simultaneously imprinting a sales slip and a summary strip with indicia contained on a printing plate:
   a support including a platform for receiving said plate and said sales slip with the slip in overlying relationship with said indicia, said platform having an opening therein;
   means on said support for removably maintaining the plate on the platform;
   means for supporting said summary strip with a portion thereof in overlying relationship with said indicia;
   shiftable means on the support engageable with said strip for advancing the strip longitudinally thereof a predetermined distance each time the shiftable means is actuated;
   structure on the support movable between an inoperative position and a position where said slip and the portion of the strip overlying said indicia are pressed between the plate and the structure; and
   means operably coupled with said shiftable means and operable to actuate the latter to advance the strip said predetermined distance, said actuating means having a shiftable operating arm received in said opening and disposed for engagement by said plate to shift the arm when the plate is placed on the platform, whereby said shiftable means is actuated each time a printing plate is placed on the platform to thereby align a different portion of the strip with the the indicia on the plate.

3. The invention of claim 2, wherein said shiftable means includes a rotatable device engageable with said strip, said operating arm comprising a pawl, said actuating means including a ratchet wheel operably coupled with the device for engagement by said pawl.

4. The invention of claim 3, wherein said means for supporting said strip comprises a container for holding a part of said strip therewithin, the container having an opening therein permitting the remainder of the strip to extend from the container, said portion of the strip in overlying relationship with the indicia being a part of said remainder, said support including a receptacle beneath said platform, the platform having a slot therein, said remainder of the strip extending through the slot and into said receptacle, said rotatable device being disposed in said receptacle for pulling the strip through the slot and into the receptacle upon actuation of the device.

References Cited by the Examiner

UNITED STATES PATENTS

| | | | |
|---|---|---|---|
| 1,497,766 | 6/24 | Balkwill | 101—228 |
| 2,041,831 | 5/36 | Helsel | 101—228 X |
| 2,547,472 | 4/51 | Jetter | 101—269 X |
| 2,606,494 | 8/52 | Vogt | 101—269 |
| 2,759,727 | 8/56 | Bromberg | 270—93 |
| 2,782,714 | 2/57 | Davidson | 101—274 |

ROBERT E. PULFREY, *Primary Examiner.*

EUGENE R. CAPOZIO, *Examiner.*